United States Patent

[11] 3,582,185

| [72] | Inventors | Werner Steiger<br>Nassackerstrasse, Birmensdorf/ZH<br>Heinrich Hogg, Im Sandacker,<br>Otelfingen/ZH, both of, Switzerland |
|---|---|---|
| [21] | Appl. No. | 818,289 |
| [22] | Filed | Apr. 22, 1969 |
| [45] | Patented | June 1, 1971 |
| [32] | Priority | Apr. 24, 1968 |
| [33] | | Switzerland |
| [31] | | 6110/68 |

[54] SCHLIEREN OPTICAL SYSTEM
7 Claims, 7 Drawing Figs.

[52] U.S. Cl. ............................................. 350/161, 178/7.5(D)
[51] Int. Cl. ............................................. G02f 1/28
[50] Field of Search ............................................. 350/161, 160; 178/7.5 D

[56] References Cited
UNITED STATES PATENTS

| 2,557,974 | 6/1951 | Kibler | 250/199 |
| 2,943,147 | 6/1960 | Glenn | 178/7.5 |
| 3,016,417 | 1/1962 | Mast et al. | 178/7.5 |

*Primary Examiner*—Ronald L. Wibert
*Assistant Examiner*—J. Rothenberg
*Attorney*—Pierce, Scheffler & Parker

ABSTRACT: This invention relates to a Schlieren optical system comprising a medium for controlling the light of a separate light source for illuminating the image field on the control medium, and a masking system having mirrors arranged in a checkerboard pattern located in the path of the illuminating beam to divide the light into individual rays, the mirrors being so mounted as to provide a masking system in the path of the image beam to prevent or allow the passage of light when the control medium is in an undeformed or deformed state respectively.

Inventors
Werner Steiger
Heinrich Hogg

By Pierce, Scheffler & Parker
Attorneys

Inventors
Werner Steiger
Heinrich Hogg

By Pierce, Scheffler & Parker
Attorneys

SCHLIEREN OPTICAL SYSTEM

This invention relates to Schlieren optical systems having a checkerboard masking system for controlling light from a deformable medium.

These Schlieren optical systems are particularly well suited to the reproduction of typeface and similar originals, since because of the checkerboard distribution of the light the brightness of the lines being reproduced does not depend on the direction of the letter strokes or if it does only insignificantly so; this does not apply in the case of the equally well-known bar system, where the variation in brightness represents a disadvantage.

Especially with regard to the reproduction of typeface good legibility makes it essential that as much light as possible be directed on to the image field. The Schlieren optical systems with "checkerboard" masks available to date could not entirely satisfy this requirement.

In an optical system in accordance with a preferred embodiment of the invention the mask is located in the illuminating beam and is made up of flat mirrors arranged in a checkerboard pattern, the mirrors being mounted so that when viewed from the direction of the light source they appear contiguous, whereas from the direction of the image field the spaces between the mirrors have about the same area as the surface area of the mirrors.

One of the most suitable designs in accordance with the invention comprises a checkerboard system of mirrors which is located in the path of both the illuminating beam and the image beam, so that the mirror system acts both to reflect light onto the image field and as a mask to control the intensity of that field.

Figure 1:
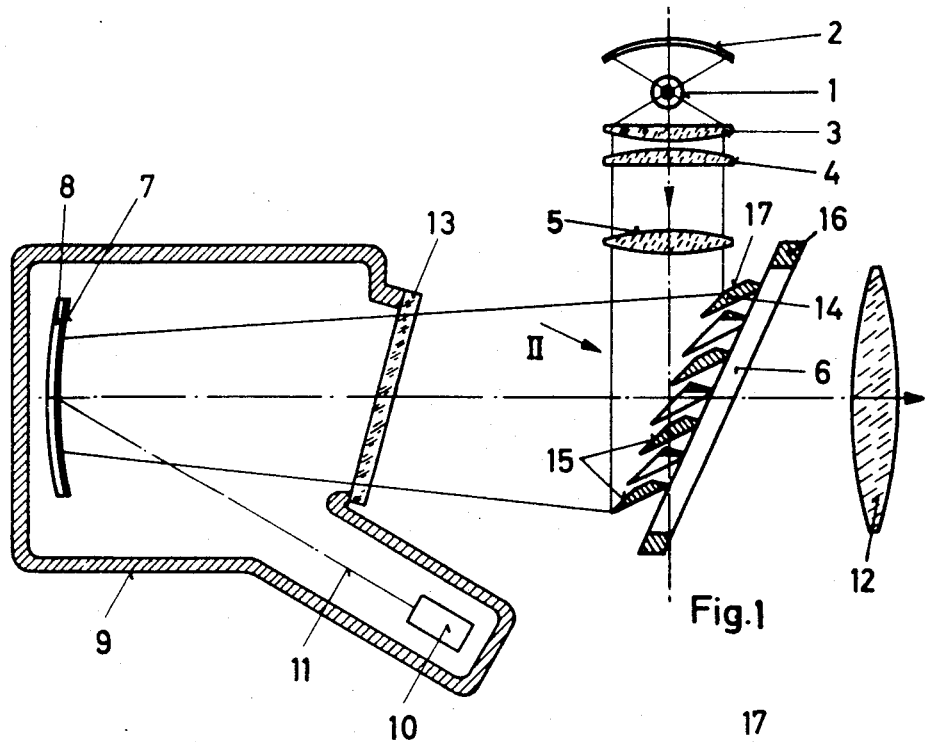
FIG. 1 is a general schematic representation of a Schlieren optical system in accordance with the present invention.

As depicted in FIG. 1 an illumination system comprises a light source 1 having a reflector 2 and a system of condenser lenses 3 and 4. Light from the illumination system is incident on a mask 6 made up of flat mirrors 14 arranged in a checkerboard pattern which reflects the incident light on to a deformable control medium 7 in the form of a thin layer of, for example, oil on the surface of a concave mirror 8. A lens 5 images the light in the plane of the condenser lens 4 on to the control medium. The concave mirror 8 is housed in a vacuum chamber 9 which contains a cathode ray gun 10. The electron beam 11 generated by the cathode ray gun is modulated by electrical signals representing the image to be formed on the control medium 7 in such a way that a charge distribution is created on the surface of the control medium which deforms in accordance with the image information to control the brightness distribution of the projected image. The mirror system mask 6 is located at the center of curvature of the concave mirror 8 so that when the surface of the control medium is not deformed, the light from the source 1 is reflected by the mirrors 14 on to the mirror 8 and is then reflected back to the source 1 by the mirrors 14. When the surface of the control medium is deformed, however, the light at the point of the image at which the deformation occurs is reflected mirrors accordance with the degree of deformation. The beam now passes between the mirrors 14 of the system 6 and is imaged on a projection screen (not shown) in the direction of the arrow by an objective lens 12. This lens 12 is mounted so that it produces an image of the control medium on the screen. A plane parallel glass plate 13 provides a vacuumtight seal for the chamber 9 and is set at an angle to the optical axis to avoid undesired reflections. To avoid complicating the schematic diagram auxiliary devices such as those required to maintain the vacuum in the chamber, for rotating the concave mirror to maintain an even thickness of oil thereon and for controlling its temperature and replenishment have been omitted. The electrical supply to the light source and the equipment for producing and deflecting the electron beam are not shown either.

The effective surfaces 15 of the mirrors 14 belonging to the same row lie in a common plane. The various planes are offset one against the other so that when viewed from the position of the light source 1 all the mirrors 14 appear to meet. As a result practically all the incident light is reflected. In contrast, when seen from the direction of the control medium 7 the mirrors 14 are not contiguous but are separated by spaces; the dimensions of these intervening spaces through which light deviated by deformation of the control medium passes correspond approximately to the dimensions of the surface area of the mirrors.

For preference these mirrors should have a so-called "dark edge" or nonreflecting edge 17 along one or several sides so that when seen from the image field the cross-sectional area between the mirrors through which light deviated by the control medium passes is smaller than the total surface area of the mirrors. Such a design in which the total area of the mirrors is larger than the cross section of the intervening spaces ensures that the image projected by the lens 12 is not affected by undesired variations in the thickness of the control medium. The image of the flat mirrors reflected on to them by the concave mirror 8 when the control medium is not deformed is smaller than the total area of the mirrors. The area of the "dark edge" 17 is between one-tenth and one-fifth of the reflective surface area of the mirrors. This dark edge can be black (i.e. light absorbent) or mirrored. In the latter case the light striking the "dark edges" is not absorbed but deflected away from the optical axis of the lens 12 and mirror 8, this reduces the heating effect on the mirrors and their mountings.

Figure 2:
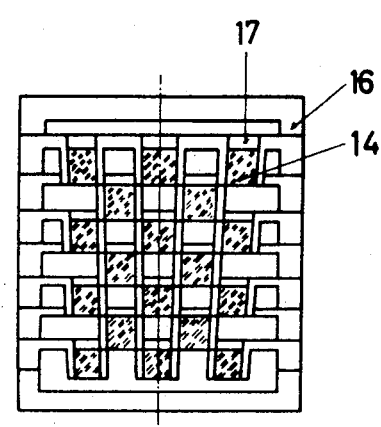
FIG. 2 is a detail drawing of the checkerboard mirror system as seen from the direction of arrow II in FIG. 1.
Figure 3:
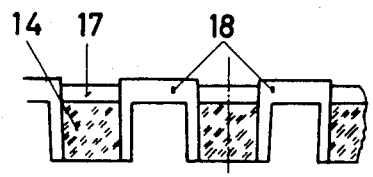
FIG. 3 shows part of the mirror system of FIG. 2 to a larger scale.

As shown in FIGS. 2 and 3 the mirrors 14 are mounted in U-shaped holders 18, e.g. with adhesive, the two sides of these first and last holders acting as dark edges. The holders 18 of a row are in turn secured to a common frame 16.

Figure 4:
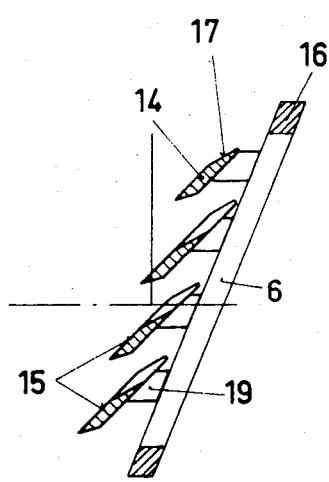
FIGS. 4 to 7 show cross-sectional and plan views of two different forms of checkerboard mirror systems.
Figure 5:
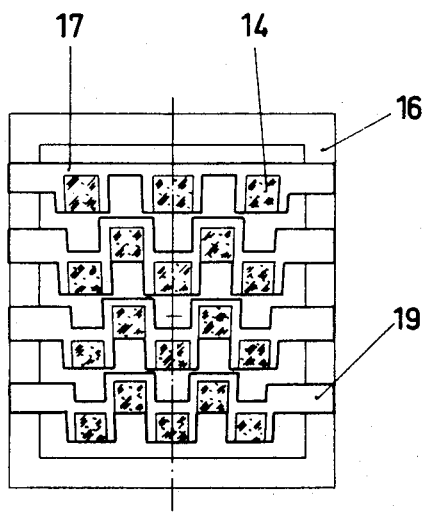

In the case of the alternative form of mirror system shown in FIGS. 4 and 5 two rows of mirrors are mounted on a common carrier 19, these carriers being again secured to the frame 16.

Figure 6:
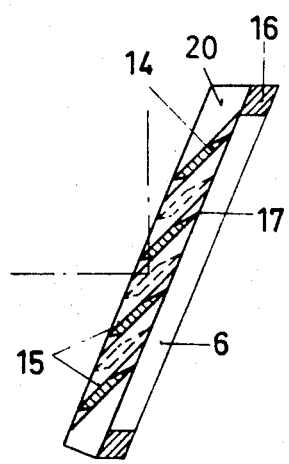
Figure 7:
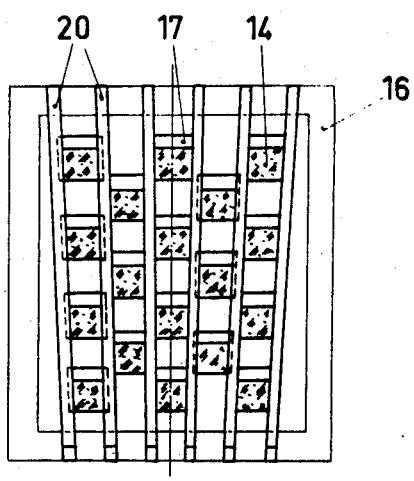

Another variation is shown in FIGS. 6 and 7 in which the mirrors 14 are held in slotted carriers 20 running at right angles to the mirror rows. "Dark edges" are formed by the carriers themselves and by the edges 17 of the mirrors. All the carriers are secured to a common frame 16.

The mask system 6 formed by the mirrors arranged in a checkerboard pattern illustrated in the foregoing embodiments is used both for reflecting light from the source on to the image field and for controlling the image projected by the lens 12. The invention is not limited to the use of a single mask which fulfills a dual role; control of the projected image could also be achieved by means of a separate mask.

What we claim is:

1. A Schlieren optical system comprising a light source, a deformable reflective medium and a mirror assembly for reflecting light from the source on to the deformable medium, the mirror assembly comprising mounting means and a plurality of mirrors mounted thereon in a checkerboard pattern, each mirror being mounted at such an angle to the plane of the mounting means that the mirrors as seen by the light source appear to be contiguous while as seen from the deformable medium the mirrors appear to be spaced apart so that when the medium is in the undeformed state, light from the source is imaged on to said medium and reflected by the medium and mirrors back to said source while deformation of the medium deviates the light reflected therefrom to pass through the spaces between the mirrors.

2. A Schlieren optical system in accordance with claim 1, in which the individual mirrors all have a nonreflecting edge along at least one side.

3. A Schlieren optical system in accordance with claim 1, in which said mounting means comprises U-shaped holders.

4. A Schlieren optical system in accordance with claim 3, in which the two sides of said U-shaped holders are acting as nonreflecting edges.

5. A Schlieren optical system in accordance with claim 1, in which said mounting means comprises carriers, each carrier supporting two adjacent rows of mirrors and being secured to a common frame.

6. A Schlieren optical system in accordance with claim 1, in which said mounting means comprises slotted carriers mounted at right angles to the rows of mirrors, the mirrors being held in said slots, said carriers being secured to a common frame.

7. A Schlieren optical system in accordance with claim 6, in which the carriers have a nonreflecting surface adjacent the mirrors.

PO-1050
(5/69)

UNITED STATES PATENT OFFICE
CERTIFICATE OF CORRECTION

Patent No. 3,582,185          Dated June 1, 1971

Inventor(s) Werner Steiger and Heinrich Hogg

It is certified that error appears in the above-identified patent and that said Letters Patent are hereby corrected as shown below:

Claims 5 and 6, line 1 of each, the numeral "1" should be changed to - 2 -

(see applicants' communication filed October 7, 1970)

Signed and sealed this 31st day of August 1971.

(SEAL)
Attest:

EDWARD M. FLETCHER, JR.
Attesting Officer

ROBERT GOTTSCHALK
Acting Commissioner of Patents